(12) United States Patent
Polanco

(10) Patent No.: US 12,246,686 B1
(45) Date of Patent: Mar. 11, 2025

(54) HYDRAULIC SAFETY MOTORCYCLE SYSTEM THAT IS CONNECTED TO THE HYDRAULIC BRAKE SYSTEM OF A MOTORCYCLE

(71) Applicant: Ayban Carlos Garcia Polanco, Miami, FL (US)

(72) Inventor: Ayban Carlos Garcia Polanco, Miami, FL (US)

( * ) Notice: Subject to any disclaimer, the term of this patent is extended or adjusted under 35 U.S.C. 154(b) by 0 days.

(21) Appl. No.: 18/892,365

(22) Filed: Sep. 21, 2024

(51) Int. Cl.
- *B60T 13/66* (2006.01)
- *B60T 17/22* (2006.01)
- *B60T 13/74* (2006.01)

(52) U.S. Cl.
CPC ............ *B60T 13/662* (2013.01); *B60T 17/22* (2013.01); *B60T 13/746* (2013.01); *B60Y 2200/12* (2013.01)

(58) Field of Classification Search
None
See application file for complete search history.

(56) References Cited

U.S. PATENT DOCUMENTS

| | | | | |
|---|---|---|---|---|
| 12,139,112 | B2* | 11/2024 | Saotome | B60T 13/745 |
| 2006/0048512 | A1* | 3/2006 | Ohlig | B60T 13/147 |
| | | | | 60/547.1 |
| 2007/0252430 | A1* | 11/2007 | Nishikawa | B60T 8/4031 |
| | | | | 74/89.23 |
| 2009/0039701 | A1* | 2/2009 | Hinz | B60T 8/3225 |
| | | | | 303/9.63 |
| 2010/0264723 | A1* | 10/2010 | Atsushi | B60T 13/686 |
| | | | | 303/10 |
| 2011/0024249 | A1* | 2/2011 | Nishikawa | B60T 8/261 |
| | | | | 701/70 |
| 2013/0017103 | A1* | 1/2013 | Kodama | H02K 5/225 |
| | | | | 417/410.1 |
| 2014/0117747 | A1* | 5/2014 | Yang | B60T 13/745 |
| | | | | 303/6.01 |
| 2016/0023636 | A1* | 1/2016 | Keating | H04W 4/44 |
| | | | | 701/2 |
| 2017/0197584 | A1* | 7/2017 | Keating | B60R 25/33 |
| 2019/0184782 | A1* | 6/2019 | Shaw | B62K 11/04 |
| 2023/0078749 | A1* | 3/2023 | Kotaka | B62L 3/023 |
| | | | | 303/11 |
| 2023/0130988 | A1* | 4/2023 | Koike | B60T 8/261 |
| | | | | 303/11 |

* cited by examiner

*Primary Examiner* — Jonathan M Dager
(74) *Attorney, Agent, or Firm* — Ruben Alcoba, ESQ.

(57) ABSTRACT

A hydraulic safety motorcycle system that is connected to the hydraulic brake system of a motorcycle. The system includes passive and active security and safety characteristics such as automatic braking when the motorcycle is parked and obstacle sensors that detect possible collisions or crashes. Additionally, the system monitors speed and adjusts braking pressure in steep descends, which improves significantly the riding experience. In terms of antitheft it has a GPS, cameras, movement sensors, and facial recognition allowing remote motorcycle immobilization and notify the authorities of any theft or robbery attempt. The mobile application integration enables remote management of multiple system functions such as the start of the motorcycle and different emergency actions. With Wi-Fi and Bluetooth connection as well as specialized software, the system ensures that there is an efficient control and response among different situations, offering peace of mind and security for the owners.

8 Claims, 9 Drawing Sheets

HYDRAULIC SAFETY MOTORCYCLE SYSTEM THAT IS CONNECTED TO THE HYDRAULIC BRAKE SYSTEM OF A MOTORCYCLE

TECHNICAL FIELD OF THE INVENTION

The current invention enters the broad field of vehicular safety technology with a focus in the advance driving assistance systems as well as preventive theft measures for motorcycles. This system is of utmost importance for the automotive industry since it uses technologically advanced technology principles that not only improve vehicle's safety but also improve road safety as it minimizes the risk of driving accidents/crashes.

Understanding that motorcycles are broadly used given their fuel efficiency and overall low cost of ownership made providing a solution that also adds active and passive safety crucial. This system not only benefits the individual riders but organizations that require motorcycles. Examples of it are the delivery and correspondence services where safe and agile mobility is key for the transportation of goods and services. Additionally, the tourism industry that uses motorcycles to do excursions and sight-seeing as well as renting that will be having a trustworthy system that protects their customers and vehicles.

This system can also be adapted to other vehicles (two-wheeled), including motorized bicycles and electric scooters that are currently gaining popularity in big cities due to their sustainable transportation and energy efficient focus. The system, however, not only covers current needs but it is anticipating emerging trends for mobility and road safety. In summary, the hydraulic safety motorcycle system that is connected to the hydraulic brake system of a motorcycle represents an intersection of current applied information technology and motor safety innovation, supporting a future utilization in different commercial and personal applications.

PRIOR ART DESCRIPTION

There are currently a variety of technologies directed to riding and theft prevention assistance. Presented below are some of the top for each different category.

Riders' assistance: Anti-lock Brake System (ABS): It helps to prevent wheel lock while braking, improving stability and motorcycle control.

The modular and scalable motorcycle ABS (antilock braking system) was especially designed for the braking characteristics of two-wheelers and can be adapted to a wide range of models from small bikes to high-performance bikes. It supports the rider while braking, even in case of hard braking or on slippery roads. It prevents wheel lockup, ensures vehicle stability and optimal deceleration while braking. Motorcycle ABS therefore contributes to reducing the risk of falling and to shortening the stopping distance.

Traction control in Motorcycles: Applying too much throttle abruptly may cause an unexpectedly large amount of power to be sent to the rear wheel, causing it to spin and make the machine unstable. The Traction Control System (TCS) minimizes such worries by automatically adjusting the drive force sent to the rear wheel. This type of system is used widely by automakers as well under a variety of names, but Yamaha Motor uses the designation "TCS."

The first Yamaha motorcycle equipped with TCS was the DT230 LANZA that debuted in 1997. It was a lightweight and compact model aimed at trail riding and the like, and TCS was adopted to assist riders while in such environments. At the time, changes in engine rpm were monitored to detect the rate of acceleration and thereby predict rear-wheel slippage (spin). Then, based on engine rpm and rate of acceleration, the system would control ignition timing and generate an effective amount of drive force.

Today, many large-displacement motorcycles feature TCS governed by electronic control systems, but its role can differ somewhat depending on the model's character.

GPS NAVIGATION: GPS technology in motorcycle riding extends beyond basic navigation; it encompasses a wide range of functionalities designed to cater to riders' unique needs. Modern motorcycle GPS systems feature rugged, weather-resistant designs, high-visibility screens readable even in direct sunlight, and battery life suited for extended journeys. These devices seamlessly integrate with other motorcycle technologies, including Bluetooth connectivity for helmet headsets, enabling hands-free communication, music streaming, and audible navigation directions.

The evolution of GPS technology has also brought sophisticated mapping and routing options. Riders can customize routes based on their preferences, whether seeking the fastest, shortest, or most scenic path. Advanced systems adjust routes in real-time, considering traffic conditions and road closures to ensure efficient journeys. For adventure-seeking riders, GPS systems provide off-road mapping and trail tracking, opening up new exploration possibilities beyond paved roads.

In addition to practical applications, GPS technology fosters a sense of community among riders. Many devices and apps allow for the sharing of favorite routes and ride logs, enabling motorcyclists to discover new adventures and connect with others who share their passion for the road.

Rearview Camera: The rearview camera is used in vehicles so that the driver/riders can have a better perspective of what is behind, reducing blind spots.

What is a blind Spot? It is an area on the side of any vehicle, on which the driver/rider has no visibility on any of their rearview or side mirrors to other vehicles. It is called a blind spot because it is an area where other vehicles/obstacles may be and the driver/rider is not able to see them, especially smaller vehicles such as motorcycles. Such can cause crashes and damage to others.

Communication Systems: Communication systems are composed by equipment that allow communication among riders and passengers as well as with smart phones.

What are intercoms? A motorcycle intercom is an electronic device that makes communication between two or more riders while they ride or among passengers. Such can be also used to listen to music, receive GPS instructions or phone calls. These devices are usually designed to be installed in the rider's helmet and use Bluetooth technology to establish connection between them. Each device intercom has a microphone and a speaker that allow for the riders and passengers to speak to each other without having to make a stop or take off their helmet. When speaking, the microphone picks up the user's voice and sends it to the speaker of the other person's intercom device which then makes for clear and effective communication.

Shifting assistance and/or Quick shifter: The shifting assistance systems make easier the shifting process from gear to gear without using the clutch.

BMW Motorrad's new gear shift assistance (ASA in German) is an innovative technological solution that facilitates riding motorcycles as well as making it more comfortable. The riding experience is improved by automatic activation of the clutch and the shifting lever without having to leave out the emotionally important dynamism of the shifting gear operation.

Motorcycle Airbags: Airbags for motorcycles are offered in some models and they deploy in the event of a crash to protect the rider.

The airbag technology, a combination of innovation, developed since the 60's is a passive safety system included in automobiles. In case of collision, these bags located in different parts of the vehicle are inflated in a record time to absorb the impact and act as cushion between the passenger/driver, and the vehicle structure, reducing the risks of injuries.

Since its development, the airbag technology has contributed to revolutionize our concepts of road safety. Due to its advantages, its use is being generalized. Particularly adapted for its use in motorcycles and scooters. What are the differences between these areas and which are the specific risks of motorcycles?

In a car, the airbag is integrated in the interior room and it deploys in case of impact to protect the driver and passengers. In the case of motorcycle riders, the airbag systems have been inspired and adapted to riders needs.

Motor Bike races, particularly, have been key to improvement in airbag technology for motorcycles that also make them more popular as years go by. Incorporated in the racing suits of the riders, allow an optimal protection during tests and races. Day to day the airbag jackets can be found in Motor Bike racing schools as well as Bike Police Patrol Units.

Though there are some motorcycles with airbag elements, the system is generally used in on an external jacket, that is wore over ah homologated motorcycle jacket. Other motorcycle airbags are wore/used under a motorcycle jacket or included in a specific motorcycle jacket. This type of equipment is wore by the rider and provides optimal body protection.

Theft Prevention GPS System: GPS stands for Global Positioning System. To determine the position of an object (e.g. a motorbike), a transmitter and a receiver are needed. The transmitter is a satellite system in space. The receiver is a GPS tracker located on earth.

GPS satellites continuously transmit their position via radio signals. The GPS tracker on Earth receives these radio signals and converts them into its own position data. If the GPS module is in a motorbike, for example, the position data can be transmitted to the owner's smartphone so that he can see the location of his bike in real time.

The data transmission of the motorbike's location to a terminal device (e.g. smartphone) takes place via radio (e.g. 2G, 4G) and an intermediary server.

Turn block devices (Handles): There are many models that have a handle block device that do not allow movement of the handle to an operative position.

The Grip-Lock was invented by a New Zealander that was frustrated with getting wet and/or dirty when securing his motorbike with chains or disc locks. He wanted a solution that was less cumbersome, more compact and easier to apply than traditional measures used for motorcycles. After years of designing, testing and perfecting 100's of prototypes the Grip-Lock was created.

Mounting on the handlebar locking the throttle grip and brake lever in place. Applying and removing takes less than 10 seconds-a solution so quick you will use it every time.

Anti-Theft Alarms: Anti-Theft Alarms are devices that emit a strong sound if movement or manipulation attempts are detected.

The anti-theft alarm system for motorcycles is a device designed to detect any theft or unauthorized manipulation of the vehicle. These alarms are composed of different components working in conjunction to guarantee overall performance of the system.

One of the main elements of an alarm system is the movement sensor. Such is capable to detect any sudden or harsh vibration in the motorcycle, activating the alarm (siren) immediately. Additionally, some alarm systems also have a incline sensor to detect whether the motorcycle is being lifted or moved without authorization.

Once an alarm is activated, it emits a strong and shrilled sound, which alerts the owners and nearby people of possible theft. Moreover, plenty of alarm systems also include a blinking light function that brings more attention and repels thieves.

Chains and Locks: Chains and locks are devices used to secure motorcycles to fixed objects.

Chain Lock: It is the most regular and widely popular among riders. It a long chain that can be placed on any art of the motorcycle that would not allow the motorcycle to be used if the lock is not taken off.

Articulate lock: It is a similar to a chain lock, yet it is easier to place and is also more practical. These locks are covered in plastic and have an extra security since they are more resistant to be sawed or similar tools.

Fork Locks have a U Shape that allows it to be placed in the wheels and any other element in the city such as light poles. Fork locks are widely popular and have very extensive use.

Disc-Locks are very simple as their function is to lock the disk brakes of the vehicle so that the wheel can't turn. It is a cheap alternative and easy to transport as it is lightweight.

Locks with alarms are perfect options to scare thieves and avoid getting motorcycles stolen. These locks are usually disc locks that have an alarm included that is activated when someone is forcing the lock.

Start systems with Smart Key or App: You've had a motorcycle with an electronic ignition, and fuel injection, and possibly even dynamic electronic suspension adjustment, but now? Now you have one with a keyless ignition. Yipes.

These keyless systems use RFID, or Radio Frequency Identification, and that is the same technology that's used in toll readers and is the same basic premise. Your keyless motorcycle has an antenna that picks up the unique signal sent to it by your key fob. When that antenna reads the correct identification signal, the electronic system grants you access to the bike's ignition and you can then start the bike and ride it away.

You may have some questions about this, like, can I bump-start my motorcycle if it has a dead battery? And that answer, if the battery is absolutely dead dead, is a resounding no. The electronic ignition does not need a whole lot of power to run, but that is probably not going to be your blocking issue when trying to bump-start your dead-battery bike. The electronic fuel injection and fuel pump system will most likely be the larger problem. The real answer is, it depends on how dead your battery is, and it depends on your bike.

Select Kawasaki motorcycles have the ability to pair smart phones via Bluetooth technology. In most cases, if the motorcycle is equipped with this technology, the Rideology application can also be utilized. The application can monitor historical information, motorcycle settings, and record riding logs. The application can pull GPS position data from the phone in addition to several data parameters form the motorcycle. The ride log recording has to be manually started by the rider once the motorcycle is paired with the phone. A sample ride log can be seen below after it was exported from the application.

2-Way Motorcycle alarm with Remote Start: In the current and constantly evolving scheme of motorcycle security, the 2-Way Motorcycle alarm system with remote start takes the lead. This complete guide goes deep into the key characteristics, main functionality, and the technical parameters of the advances security systems for motorcycles, highlighting its part in guaranteeing safety and protection of your most precious possession.

Motorcycle Registry: Some communities have programs to register motorcycles that can help track and recover motorcycles.

Remote Start and Stop for Motorcycles device: This invention refers to an electronical preconized device that uses signals from a remote control, the start and stop of motorcycles. This device is composed using a isolated box installed inside the motorcycle. The device is to use the vehicle's 12 Volt battery as a power source.

Using the afore-mentioned systems as a basis, this HSMS invention has multiple advantages and functions.

Automatic Braking at Parking: Once the motorcycle is parked and the engine turned off, the system will automatically activate from and rear brakes. This will stop any movements from the vehicle.

Automatic Braking and Obstacle Detection: The system has sensors that detect possible frontal collision. If the rider is not responding to the visual and sound alerts emitted by the system, the brakes will be applied to avoid a crash.

Sudden Decline/Hill Speed Control Connecting to the speed-o-meter and the tachometer of the motorcycle as well as other sensors, the system is capable to identify sudden changes in speed, declines, and activate the brakes automatically keeping the rider and passengers safe.

The fusion of the automatic brake activation, obstacle sensors, incline and accelerometer provide an integral assistance system. Such not only improves safety of the rider when facing sudden descends but also increases confidence in the rider while riding in challenging conditions, making the whole riding experience safer and much more controlled.

Brakes pressure adjustment in real time: The system monitors and adjust the braking pressure/force without the need of rider input. If additional pressure/force is required, the system will increase pressure until the brake actuator/lever is released.

Faulty Break Lines Detection In case there is a broken brake line or leakage the system will detect the loss of pressure and notify the owner via cellphone alert, also, using audio and visual signs.

Distracted rider alert: If the rider is over 30 MPH and not looking at the front/forward, the system will emit a visual and sound alert. If the distraction continues (rider is still not looking forward), the system will gradually increase the brake pressure and intensify the sound alert until the rider is back into the required position.

Additional Safety Functions: The system includes and emergency button (911), microphone, Camera, Finger Print sensor, among others that will be later discussed.

Invention Description

This invention is focused in an advanced safety system called a hydraulic safety motorcycle system that is connected to the hydraulic brake system of a motorcycle (hereinafter HSMS), designed to assist motorcycle riding and prevent their theft. Such an innovative system integrates a series of the newest technologies to offer protection to both the rider and the bike. Below are further explanations of the system advantages that provide a clear understanding of how it improves safety in comparison with previous technologies.

Active and Passive Safety: The HSMS combines the active and passive safety to guarantee a safer riding experience. Among the top functions the system has are automatic braking that activate when the motorcycle is turned off. Once the ignition key is on the Off Position, the front and rear brakes are blocked automatically, which in turn stops any movements while the motorcycle is parked. Such will discourage theft and improve safety. Most importantly, although uncommon, the motorcycle might shut down while being ridden due to a mechanical or electrical failure. However, the HSMS has an independent power source which guarantees all sensors and components continue to work and communicate to the main board. This allows the motorcycle to continue rolling even when the motorcycle is not parked. While riding, the system has sensors that emit visual and sound alerts to warn the rider. If the rider does not react in time the system will automatically apply the brakes to avoid a collision or crash. Additionally, the system will connect to speedometer and tachometer to monitor speed while also using an accelerometer as well as an incline sensor to detect sudden changes in steep descend, thus, using this data to activate the brakes automatically and control the speed of the motorcycle. Moreover, the system would adjust the brakes' pressure based on the rider's requirements as they use the brake actuator. This works as the system monitors the pressure applied on the actuator and the one delivered by the brakes to adjust for more pressure when the rider keeps pulling the actuator and reducing it if the rider pulls and releases the actuator quickly.

Distracted Rider Alert: If the rider is going over 30 MPH and takes their eyes from the road (front), the system will emit a visual and sound alert. If the rider is not responding to the alert, the system will increase the brakes' pressure and sound intensity gradually until the rider's eyes are back on the road.

Brakes Adjustment and Monitoring: The HSMS monitors continuously the applied pressure/force on the brakes using specific sensors. If the rider needs additional pressure/force, the rider can apply it themselves as the system will also adjust the braking force. In such case that there is a leak on the braking hoses or any interference/restriction of the flow of the braking fluid, the system will detect the fall in brake pressure, notify the owner via cellphone while also emitting visual and sound alerts. This capability of detection prevents unexpected brake failures and guaranties and immediate response to incidents.

Anti-Theft Functionality: The HSMS is equipped with multiple anti-theft technologies. Includes a 911 button, microphone, cameras, Bluetooth technology, GPS, and WiFi, movements sensors, hit sensors, proximity sensors, and a fingerprint sensor. In case of attempted theft, the system will automatically send emergency notifications and the GPS location to the authorities as well as to pre-defined contacts. This safety protocol also allows the owner to take quick and effective actions to get their motorcycle back.

The system is designed to activate the safety functions when pressing the 911 button or say a key word on the microphone. This consequently blocks the functions of the safety key and cellphone, thus, preventing the use of the motorcycle by unauthorized people. Moreover, if the thieves try to get away on the motorcycle, the system will allow for 30 meters from GPS location or 20 seconds if there is no GPS or internet coverage in the zone before activating the brakes, shutdown the electricity, activating the lights, panic speaker, persuading the thief to abandon the motorcycle.

Technological Integration: The front panel of the HSMS incorporates multiple technological components connected to the main module through a multi-fiber connection and Bluetooth. These components include face recognition cameras and frontal vision, microphone, GPS, alert speaker, integrated antenna, 911 button, electronic card B, Wi-Fi, solar panel (electrical autonomy), charger and battery. Plus it has a fingerprint sensor, obstacle, light, movement, hit, proximity sensors as well as accelerometer and an incline sensor all designed to offer a mostly integrated and efficient system that provides safety in real time. Additionally, the system includes a mobile application that allows the owner to be informed and manage the different system functions. Among such functions there is the possibility to start the motorcycle using their fingerprints or microphone using a keyword previously programmed. This guarantees that unauthorized people can not start it even using the motorcycle key.

Increase in Connectivity and Resilience: The HSMS is equipped with an integrated antenna that improves wireless connectivity, which is essential for real time data transmission and communication with external networks and devices. If the energy is cut-off, the system's mainframe will be backed up by an external battery that ensures continuous performance of the safety system. Also, the system has a release valve to protect the hydraulic system from pressure overload keeping the components in good shape at all times.

Authorities Collaboration: One of the top unique characteristics of the HSMS is the capability to be remotely activated by the authorities in a chase when agreements are made with the specific authorities for integration with their chase system. Such characteristic shows the versatility of the system as a tool that not only is focused on personal safety but as also assisting on public safety tasks.

In Summary, the HSMS provides an unprecedented level of control and safety for motorcyclists. Combining automated braking, constant monitoring, anti-theft functions, and advanced connectivity this system represents a qualitative jump regarding other previously available solutions, offering confidence and peace of mind for both the rider and the authorities that are concerned about their safety.

INVENTION DETAILED DESCRIPTION

Figure 1:
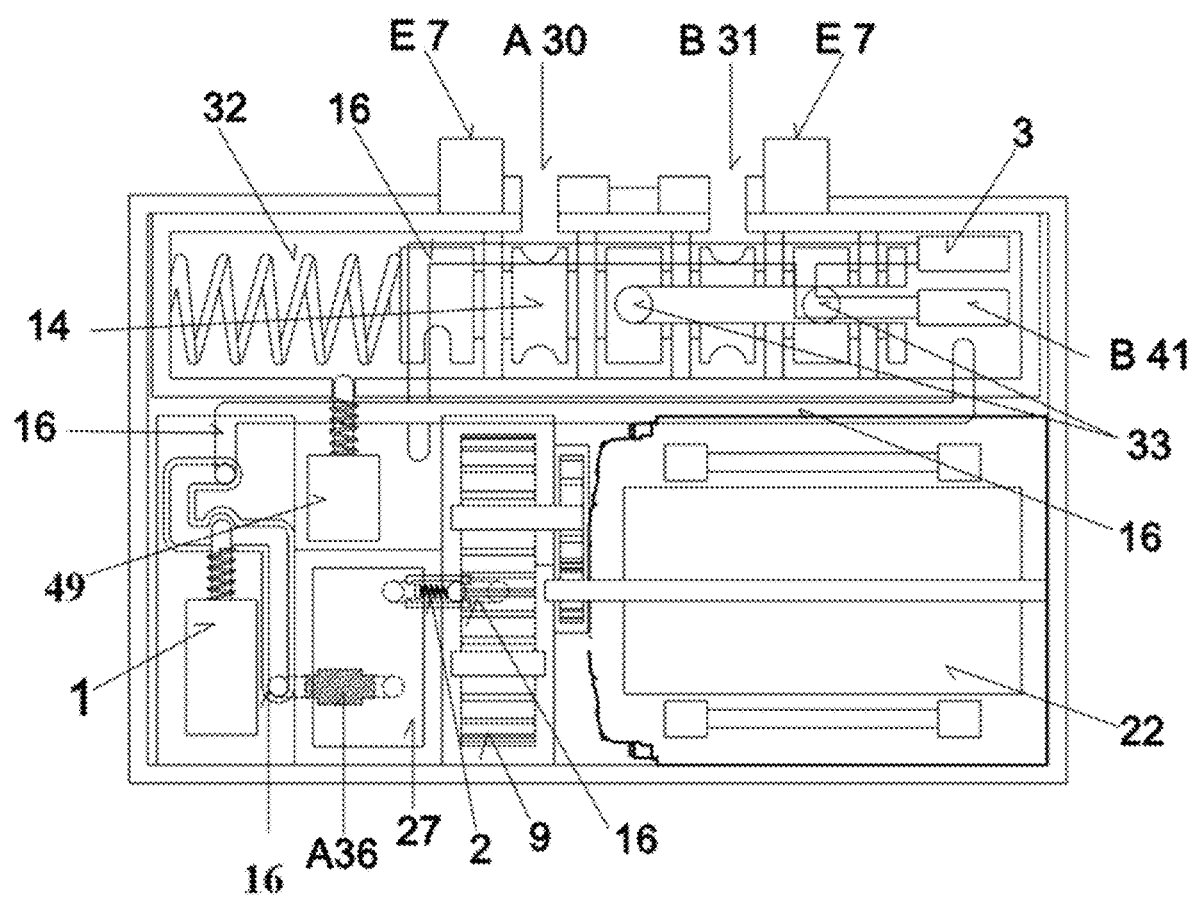
FIG. 1 shows a longitudinal section of the Main Module (48), where the different components can be seen: a section of the master cylinder (14) and the spring (32). Also shown is a view of the first pressure sensor (E 7) and a section of the liquid inlet ports (A 30) and (B 31). Likewise, you can see the conduits (16) and the view of the bolt (49), the release valve (A 36), the check valve (2), the pressure control (1), the pressurized internal tank (27), as well as the liquid pump (9), the motor (22), the relief hole (33), the relief valve (3), and the discharge valve (B 41).

Automated braking system operation. When the motorcycle is parked and the ignition actuator is off, the HSMS detects the absence of power in the ignition. In this situation, the system automatically activates the motor (22), the brake fluid pump (9) drives fluid through a conduit (16) and a retention valve (2) to the internal pressurized deposit (27). This deposit stores the compressed liquid, ready to be driven and/or added into the system when needed.

Once a signal from the main module electronic card and the front panel electronic card is received (24-46), the release valve (A36) releases the fluid through the conduit (16) to the pressure control (1). This component adjusts the fluid pressure before sending it, using another conduit (16) to the master cylinder (14).

The Master cylinder (14) moves under the fluid's pressure, closing the path of for the fluid to the liquid entry ports (A30) and (B31). These ports are connected by the front brake's handle and the rear brake pedal, respectively, and their pressure is monitored by the first pressure sensor (E7).

In this position, a bolt (49) immobilizes the master cylinder which stops it from going back into its original position due to pressure from the spring (32). The fluid moves through the master cylinder (14) and unloads through the release hole (33) to the liquid outlet ports (A34). The pressure in these ports is monitored by the second pressure sensor (S8). This pressure applied to the brakes immobilizes the motorcycle.

All these components are installed in the Main Module (48) of the HSMS.

The control system of the HSMS is based on two electronic cards: one main module electronic card (24) located in the Main Module (48), and one front panel electronic card (46) located in the front panel (39). Both cards are connected via Bluetooth and multi-fiber connection (40), which guarantees a redundant system. If a card fails, the other one acts as backup.

The electronic cards (24 & 46) both have the software that controls all the functions of the HSMS, ensuring its correct operation.

When the ignition switch is on the on position, both electronic cards (24 & 46) receive the signal and automatically activate the release discharge (B41) getting the liquid that activates the brakes to move through a conduit (16), then, to an external tank (28). The second pressure sensor (S8) now detects the reduction in pressure that immobilizes the brakes sends a signal to the electronic cards (24&46), to open the bolt (49) that releases the Master Cylinder to go back to its original position. Thus, allowing the front and rear brakes to go back to regular operation.

So that the system's integrity is kept, there is a relief valve (3) that unloads the liquid pressure from a conduit (16) if such pressure is above the programmed parameters, directing it to the external tank (28).

In order to improve security of the immobilized and parked motorcycle, the HSMS has three sensors that cover the motorcycle's perimeters permanently. These are installed in the front panel (39), proximity sensor (38) that detects the presence of objects or nearby objects or people without physical contact, a motion sensor (6) that detects movement in a determined area, and a shock sensor (45) that detects physical impacts that may indicate theft or a crash. These three sensors make for an interconnected alert system that constantly monitors the environment and motorcycle status. By working together, the sensors assure that any unexpected movement, proximity or impact triggers a security response. All this information from the sensors is received by the electronic cards (24&46) and if someone is detected, the facial recognition camera (4) is activated and verifies the identity of the rider or intruder through a unique facial features analysis allowing access only to authorized users. The peripheral view front camera (44) offers a wide view of the front environment of the motorcycle, assisting in detecting possible suspects alerted by the sensors. Additionally, the microphone (29) allows to listen the surrounding environment via cellphone and facilitates activation through voice commands from the owner, previously programmed, use security functions like calling to emergency assistance or activate/deactivate the system, improving interaction and control.

The system also includes a transceiver, which allows wireless communication, facilitating the integration of smart devices and mobile applications. This helps to monitor and control the system remotely as well as sending alerts or notifications to a mobile device. The visual signal light (23) is a system that activates in response to security alerts, this will then make aware the owner and surrounding people of possible theft or emergency. The integrated antenna (37) improves data reception and transmission that ensures constant connectivity for the GPS (10), transceiver, all crucial for the efficient system operation.

The alert horn (21) is a potent sound alarm system that activates in case of theft or emergency, which will alert the owner and dissuading possible intruders. The fingerprint sensor (5) adds security as it requires biometric authentication to start the motorcycle. This advanced group of technologies works in harmony to offer a security system as well as integral assistance that not only protects the motorcycle from theft but also optimizes the rider's experience since it adapts the motorcycle operations to current and potential environment conditions. The integration of these technical elements positions the system as a key tool to guarantee a safe, connected, and sophisticated ride, providing peace of mind to the owner.

The front panel (39) of the HSMS includes a light sensor (11) that detects changes in lighting and adjusts the motorcycle lights to improve visibility and safety, especially in poor lighting conditions. It also has a battery (25) and battery charger (13) which in turn provides reliable power to the system, adding up to an additional solar panel that offers sustainable electrical autonomy. The incline sensors (26) and accelerometer (18) monitor the position and acceleration of the motorcycle, activating safety adjustments in response to sudden or dangerous changes. The obstacles sensor (17) is fundamental to help riders to travel safely and efficiently through different riding conditions. The touch-screen (47) offers an intuitive interphase to control and configure the system functions comfortably and efficiently. The integrated antenna (37) improves reception and transmission of data, ensuring a stable and constant connection.

When a rider's bike is taken, the owner has several options to get it back. They can press the 911 button (20) or say the programmed key word to the microphone (29). Both methods will send a signal to the electronic cards (24&46) activating the transceiver (12) and GPS (10) to notify the authorities, family members and user contacts about the motorcycle's location. Moreover, the camera (4) captures and sends photos as the microphone will record audio.

Once the system is activated using the 911 button (20) or microphone (29), the HSMS blocks the safety key and cellphone, just in case the thieves may have also taken those as well thus not allowing them to take control of the motorcycle. The system will only allow the use of the fingerprint sensor (5) and microphone (29) to authorize actions. Since the location is georeferenced by the GPS, the system will confirm that the thieves move at least 30 meters from the locked position. In such case that there is no internet coverage, the system will allow for 20 seconds (programmable), before activation of the 911 button (911) or microphone (29) to activate the brakes and all the previously described safety/security system.

The HSMS avoids damage and accidents after the thieves take the motorcycle from the owners using the speedometer and tachometer. Since it receives signals from both devices, it can determine the speed that the motorcycle is moving. When the system activates after the 30 meters or 20 seconds, it uses the same protocol as if the motorcycle is parked and switched off, described previously such as the motor activates the liquid pump (9) to pull in the fluid through the conduit (16), adjust the brakes' pressure via the pressure control (1) keeping the motorcycle locked. Additionally, cutting the power, lights up the visual signal lights (23), activates the alert speaker (21), suggesting such thieves/perpetrators abandon the motorcycle. Later, the owner can get close to it and get it back using their keyword on the microphone (29) and their fingerprints in the fingerprint sensor (5).

In summary, once the rider is separated from their motorcycle, they can use the HSMS to get it back. Pressing the 911 button (20) or saying their keyword on the microphone (29), the system sends a signal to electronic cards (24&46) to activate transceiver and GPS, notifying automatically to authorities and designated contacts. Moreover, it activates cameras (4&44) to send photos and audio of the surrounding environment which will come from the microphone (29). The system blocks the safety key and cellphone, allowing only the use of the fingerprint sensor (5) and microphone (29), protecting the motorcycle. Once the thieves pull away from the affected owner, the system activates the brakes, cuts off power, turn the lights and sounds the speaker, driving away the thieves. The owner can then use the microphone (29) for their keyword and the fingerprint sensor (5) to unlock the system.

Obstacle sensors: The HSMS is designed to assist motorcycle riding; it includes obstacle sensor (17) that alert of possible frontal collision through visual and sound signals, using visual signal light (23) and an alert horn (21), If the rider does not react on time, the obstacle sensor (17) sends a signal to the electronic card (24) installed on the main module (48) and electronic card (46) installed in the front panel (39) as both have software designed to control all functions and components. These cards communicate two ways Bluetooth (43) and multifiber (40) as one is a backup of the other. Once the card receives the signal of an obstacle, the system activates the motor (22) and starts the liquid pump (9) which feeds from the external tank (28). The liquid pump (9) injects the liquid through a conduit (16) as well as a check valve (2) leading it to the pressurized internal deposit (27) where the liquid is kept in compressed state so that it can be pulled in quickly when necessary. Just as sudden as the release valve (A36) receives the signals from cards (24&46) to release the liquid, such is released via release valve (A36) through a conduit (16) to the pressure control (1) that adjusts the pressure before sending the liquid through another conduit (16) to the master cylinder (14). This cylinder moves under the liquid's pressure to close the path to the entry liquid ports A (30) and B (31) both monitored by the first pressure sensor (E7) which receives signal from the brake handle and the rear brake pedal. In this position, a bolt (49) immobilizes the master cylinder (14) not allowing it to go back to its start position due to the pressure created by the spring (32). The liquid that moves the master cylinder (14) is released through the release hole (33) to the liquid outlet ports (A34), both monitored by pressure sensor (S8). This liquid applies pressure to the brakes of the motorcycle to reduce speed based on the distance from the obstacle. If the rider needs more braking pressure, he can pull either or both the brake handle and/or pedal. Pressure sensor E (7) detects this action and release the brakes sending the signal to the main module electronic card (24) installed in the main module (48) an the front panel electronic card (46) installed in the front panel (39) that uses the discharge valve (B41) to release the liquid that is applying pressure to the brakes using conduit (16) directing the liquid to external tank (28) which in turn guarantees a fast and adequate response.

Steep Descend. The HSMS is connected to the speedometer and tachometer and receives signals from both. If the rider is surprised by a steep descend, which can increase the engine's revolutions per minute (RPM) and speed, the system will respond on an effective manner.

Equipped with an incline sensor (26), and an accelerometer (18) it detects changes in acceleration due to terrain inclines. Sensors (26&18) send a signal to the main module electronic card (24) installed in the main module, and the front panel electronic card (46) installed in the front panel (39) that have a software designed to control all system functions and components. These cards communicate using both Bluetooth and multifiber connection (40). Once the cards receive the signal of a steep descend the system activates the motor (22) and starts the liquid pump (9), which feeds from the external tank (28). The liquid pump (9) then injects the liquid through a conduit (16) and a check valve (2) to the pressurized internal tank (27) where the liquid is kept on compressed state until released when necessary. Just as a release valve (A36) receives the signal from the cards (24&46) to release the liquid such is released via the release valve (A36) through a conduit (16) to pressure control (1) that adjusts the pressure before sending it through another conduit (16) to master cylinder (14). This cylinder moves under the pressure of the liquid and it is used to block the path to liquid entry ports (A30) and (B31) that are both monitored by first pressure sensor (E7), which receives signals from the brake handle and pedal, respectively. In this position, a bolt (49) immobilizes the master cylinder (14), not allowing it to go back to its original position due to the pressure created by the spring (32). The that moves the master cylinder (14) releases through a release hole (33) that leads to liquid exit ports (A34) that are monitored by the second pressure sensor (S8). Such liquid applies pressure to the motorcycle brakes to reduce speed. If the rider needs more braking force, they can pull either or both the handle and/or pedal. The first pressure sensor (E7) will detect this need and will transmit the information to the system that will in turn increase pressure until it matches the second pressure sensor (S8). If the rider decides to release the brakes for their control, they just need to pull and release quickly the handle and/or pedal. The first pressure sensor (E7) will detect this action and release the brakes immediately and send he signal to main module electronic card (24) installed in the main module (48) and the front panel electronic card (46) installed in the front panel (39) as both cards activate release valve (B41) to release the liquid that is applying pressure to the brakes sending the liquid through a conduit (16) to the external tank (28) getting the brakes back to regular operation.

Brake Failure Detection. In case there is severe leak (brakes cut) or any system leak, the system will detect it using the first pressure sensor (E7) and the second pressure sensor (S8) since both monitor permanently the brakes' pressure. These sensors will send a signal to the electronic cards (24&46) to the transceiver 12), the HSMS will alert the owner via an alert to their cellphone. In case the signal is received while the motorcycle is being ridden, the system will activate the visual signal light (13), and the alert horn (21) to alert the owner.

Alert for rider distraction. If the rider is moving more than 30 miles an hour (30 MPH) and stops looking at the road ahead, the facial recognition camera (4) will send a signal to electronic cards (24&46). The system will then emit a visual light alert (23) and a sound alert using the alert horn (21). If the rider is still not back to look at the road ahead, the system will then increase sound alert intensity and gradually apply the brakes.

Mobile application for Remote Management. The owner can program and monitor the system functions using an mobile application, including the ignition start priority of the fingerprint sensor (4) and blocking the motorcycle using another fingerprint of another finder added to the system. It can also program a keyword to start the motorcycle using the microphone (29) as well as creating another word to alert the system of possible theft/robbery. Using the application the rider receives the status of the brakes' pressure, real time location of the motorcycle, and program the security key chain.

Protection from unauthorized use. The system stops any unauthorized use of the motorcycle by requiring fingerprint recognition (5), a nearby security key chain, or a mobile application activation to start the engine and release the brakes.

Integration with Specialized Software. The entire system is managed by an electronic card that executes specialized software that guarantees effectiveness and security/safety of the HSMS.

Figure 2:
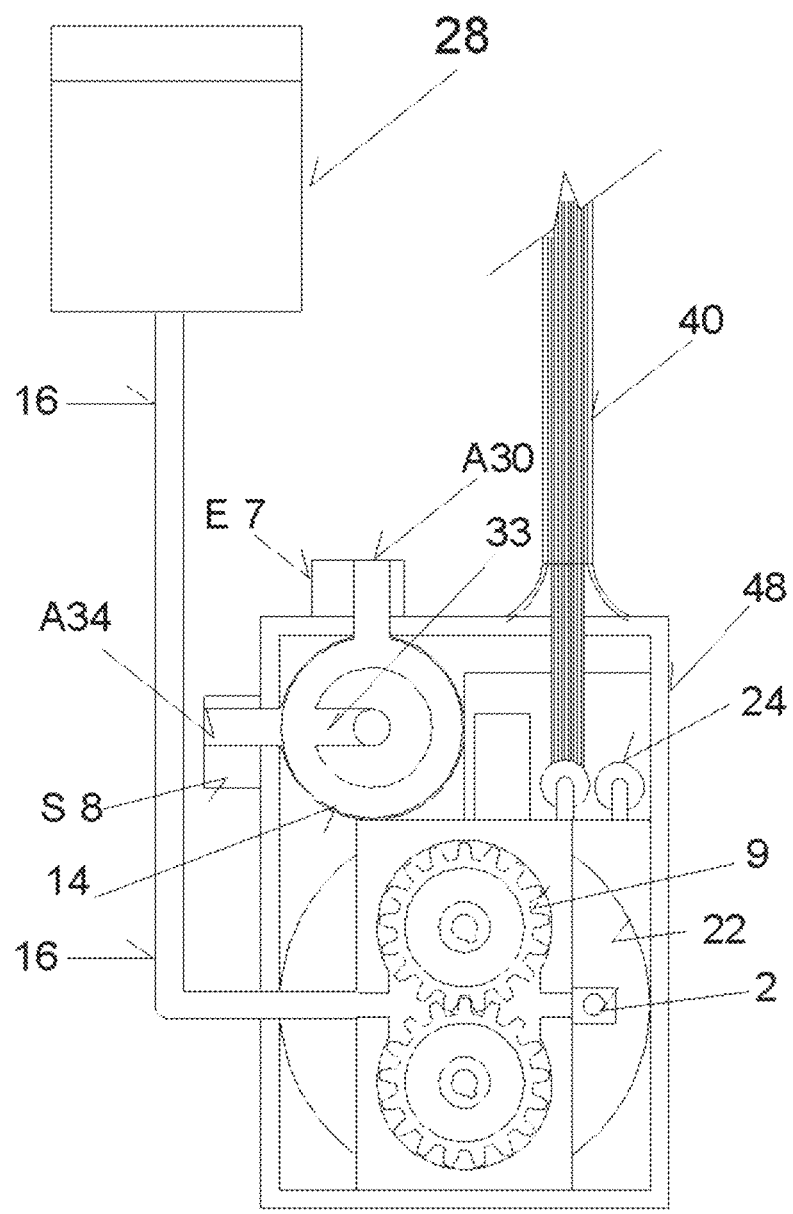
FIG. 2 shows a cross section of the main Module (48), where the different components can be seen: a view of the external tank (28), and of the conduit (16), a section of the liquid inlet port (A30), section of the liquid outlet port (A34), a section of the second pressure sensor (S 8), also another section of the master cylinder (14), section of the check valve (2), a partial view of the motor (22), section of the liquid pump (9), you can see a section of the main module electronic card (24), the multifiber connection (40), and the first pressure sensor (E7), also a section of the master cylinder (14), and the relief hole (33).
Figure 3:
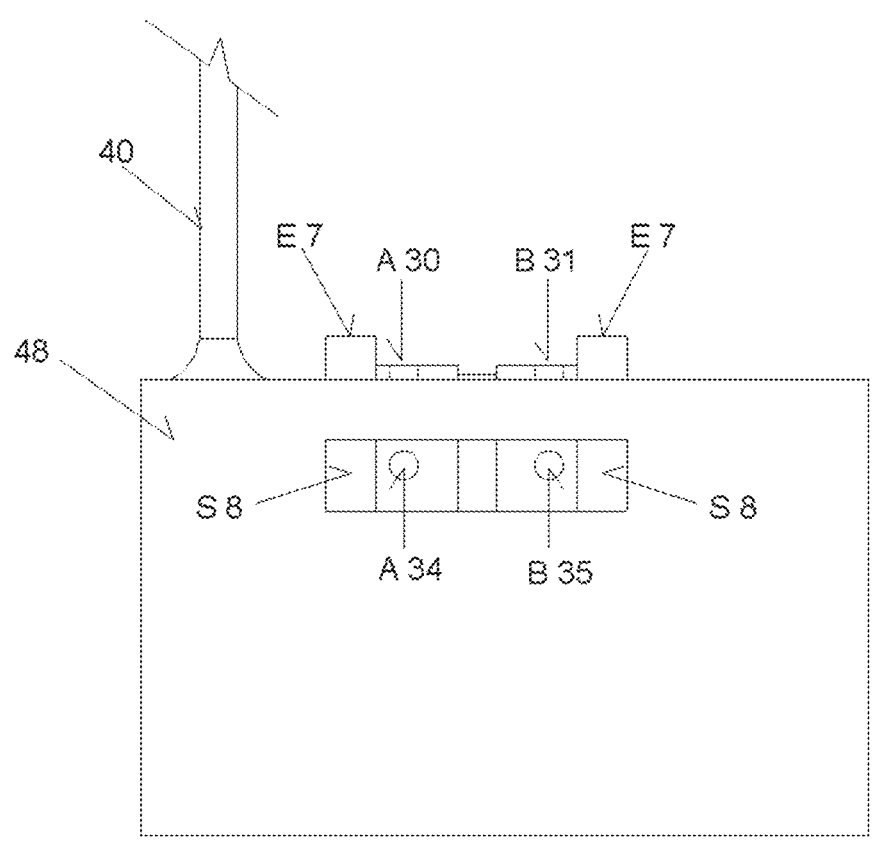
FIG. 3 shows a front elevation of the main module (48); and other components such as the multifiber connection (40), the second pressure sensor (S 8), and the first pressure sensor (E 7), as well as the liquid inlet ports (A 30) and (B 31), and also the liquid outlet ports (A 34).
Figure 4:
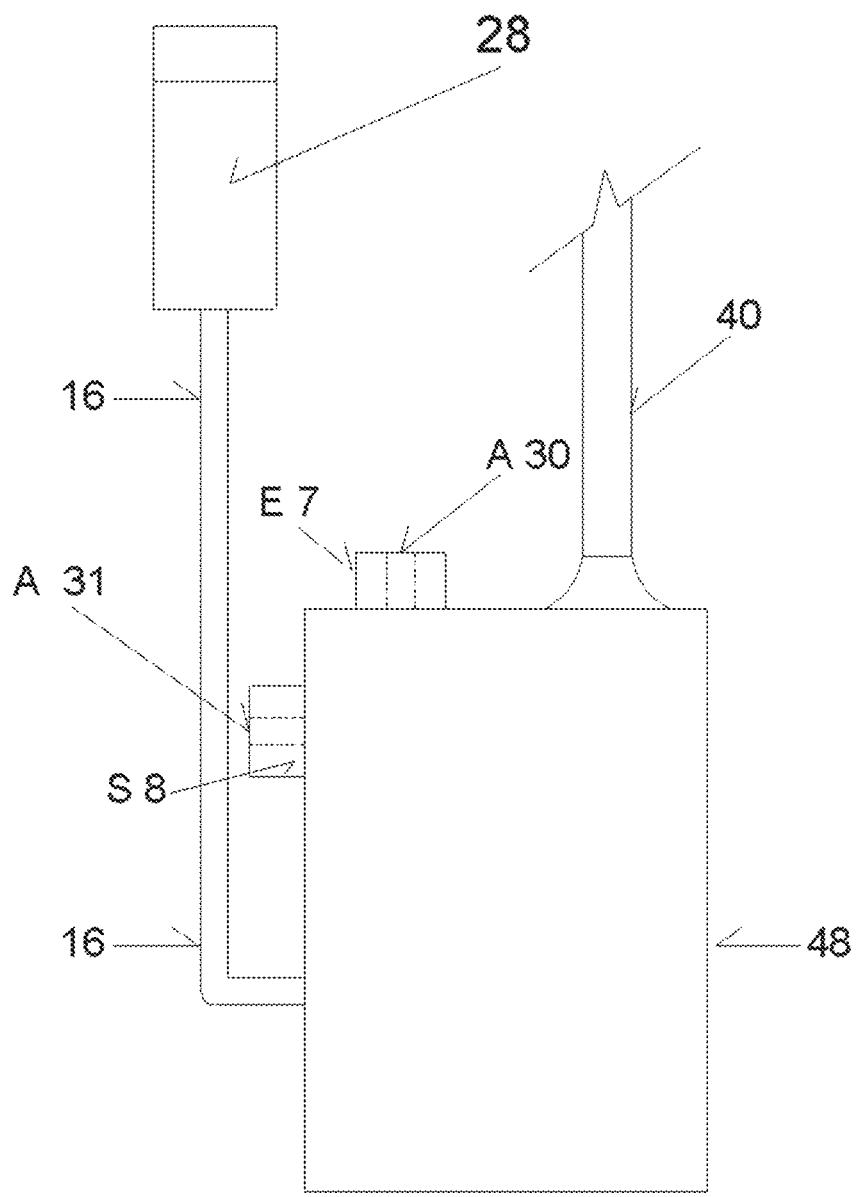
FIG. 4 shows a side elevation of the main Module (48): where you can see the different components such as the external tank (28), a conduit (16), the liquid inlet port (A 30), first pressure sensor (E7), second pressure sensor (S8), the liquid outlet port (A 34), and the multifiber connection (40).
Figure 5:
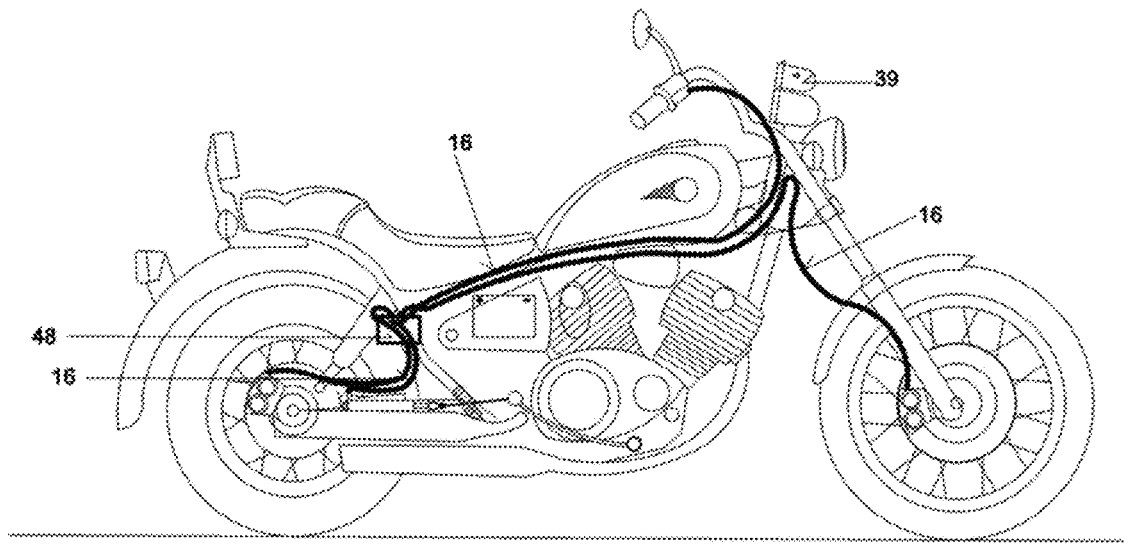
FIG. 5 shows a side view of a motorcycle where the main Module (48) and the front panel (39) are installed: you can also see the conduit (16).
Figure 6:
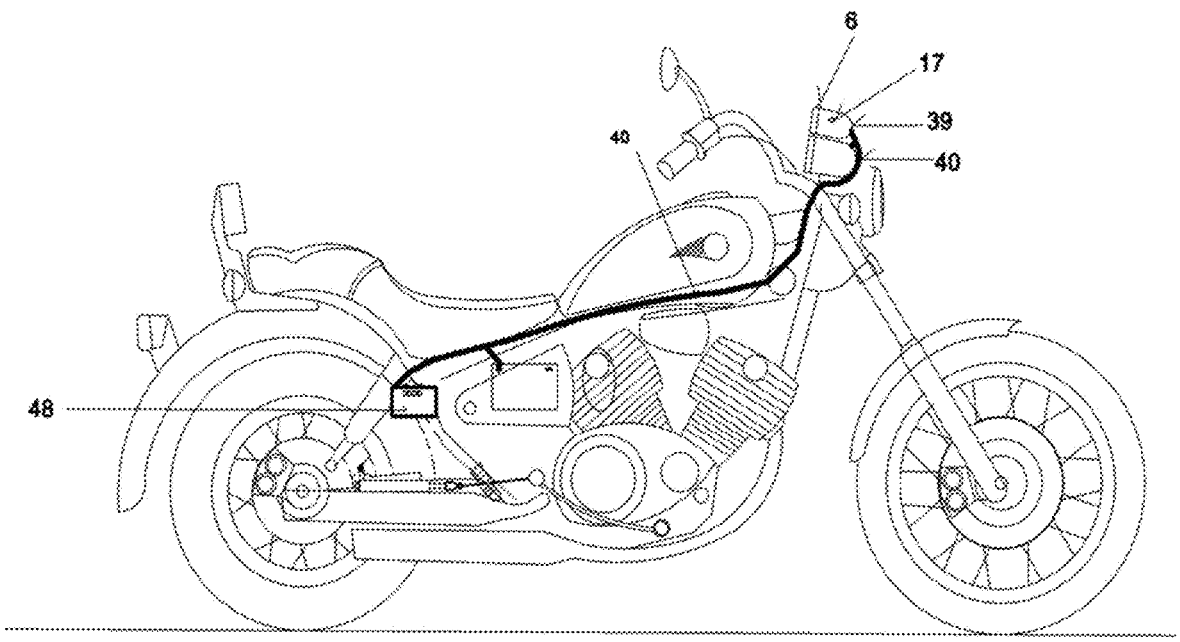
FIG. 6 shows a side view of a motorcycle where the main Module (48) and the front panel (39) are installed: we can see the multifiber connection (40).
Figure 7:
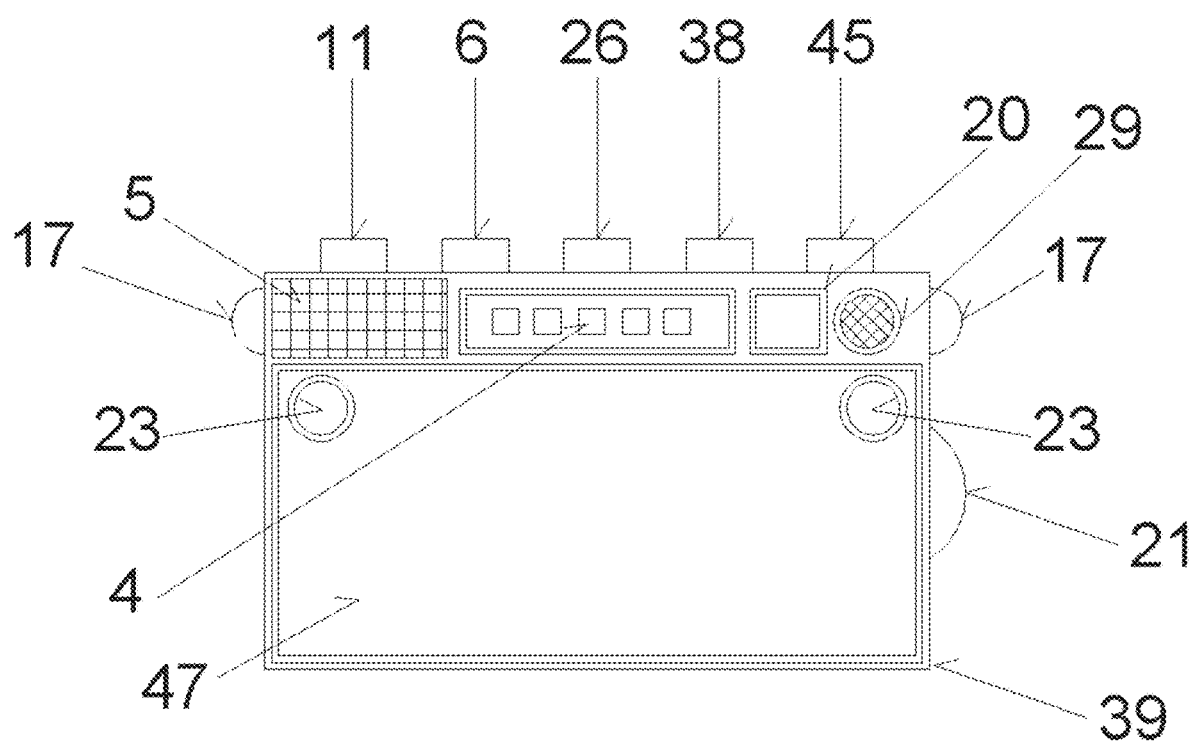
FIG. 7 shows a front view of the front panel (39): where you can see some of the installed components such as the light sensor (11), obstacle sensor (17), incline sensor (26), proximity (38), shock sensor (45), motion sensor (6), you can also see the 911 button (20), the microphone (29), visual signal lights (23), alert horn (21), touch screen (47), and the facial recognition camera (4), and the fingerprint sensor (5).
Figure 8:
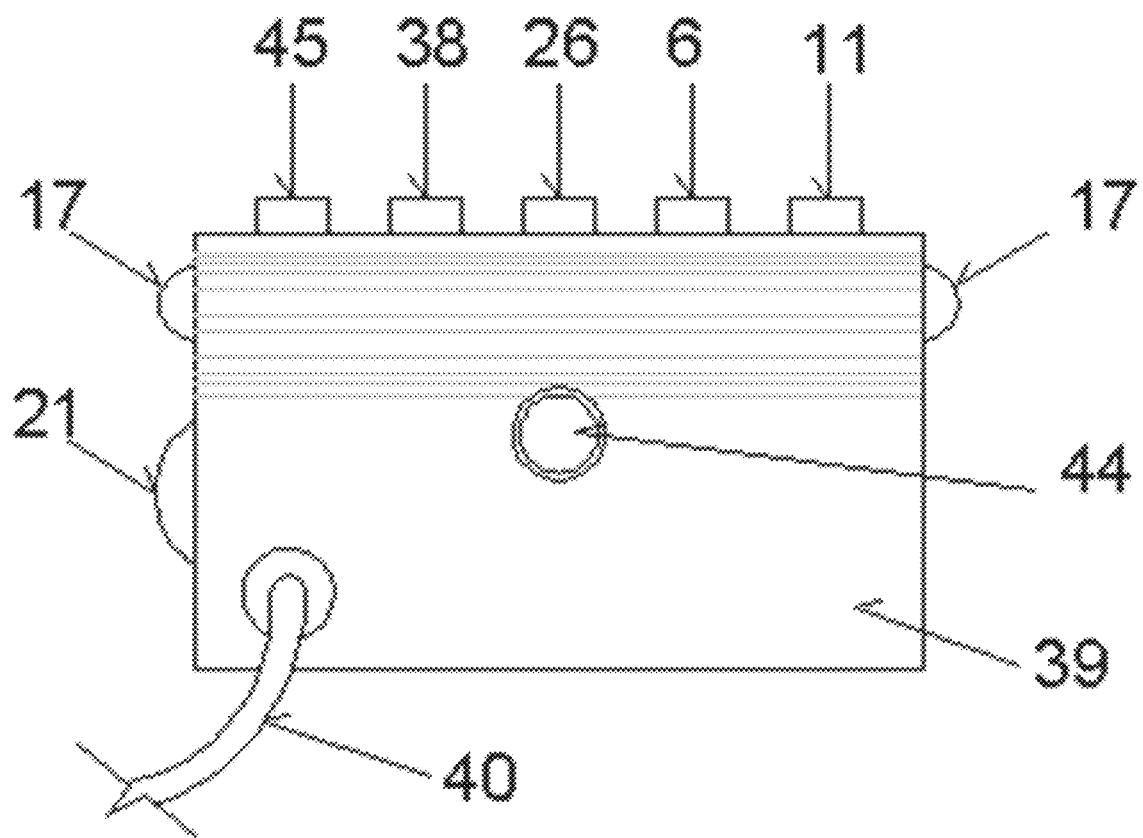
FIG. 8 shows a rear view of the front panel (39): where you can see some of the installed components such as the light sensor (11), obstacle sensor (17), incline sensor (26), proximity sensor (38), shock sensor (45), the motion sensor (6), you can also see the alert horn (21), the front peripheral view camera (44), and the multi-fiber connection (40).
Figure 9:
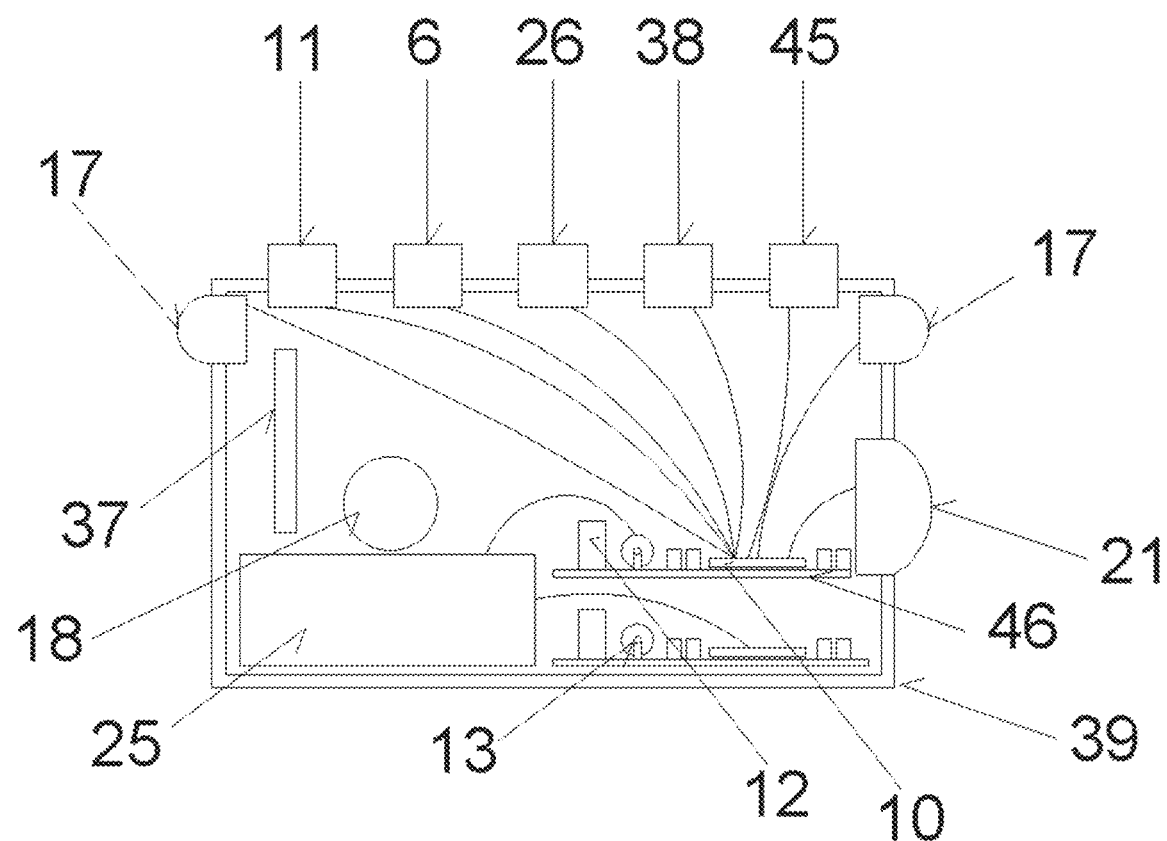
FIG. 9 shows a longitudinal section of the front panel (39): where you can see some of the installed components such as the light sensor (11), obstacle sensor (17), incline sensor (26), proximity sensor (38), shock sensor (45), the motion sensor (6), you can also see the alert horn (21), the front panel electronic card (46), where the GPS (10) and the transceiver (12) are installed. the battery charger (13), the battery (25), the accelerometer (18), and the integrated antenna (37).
Figure 10:
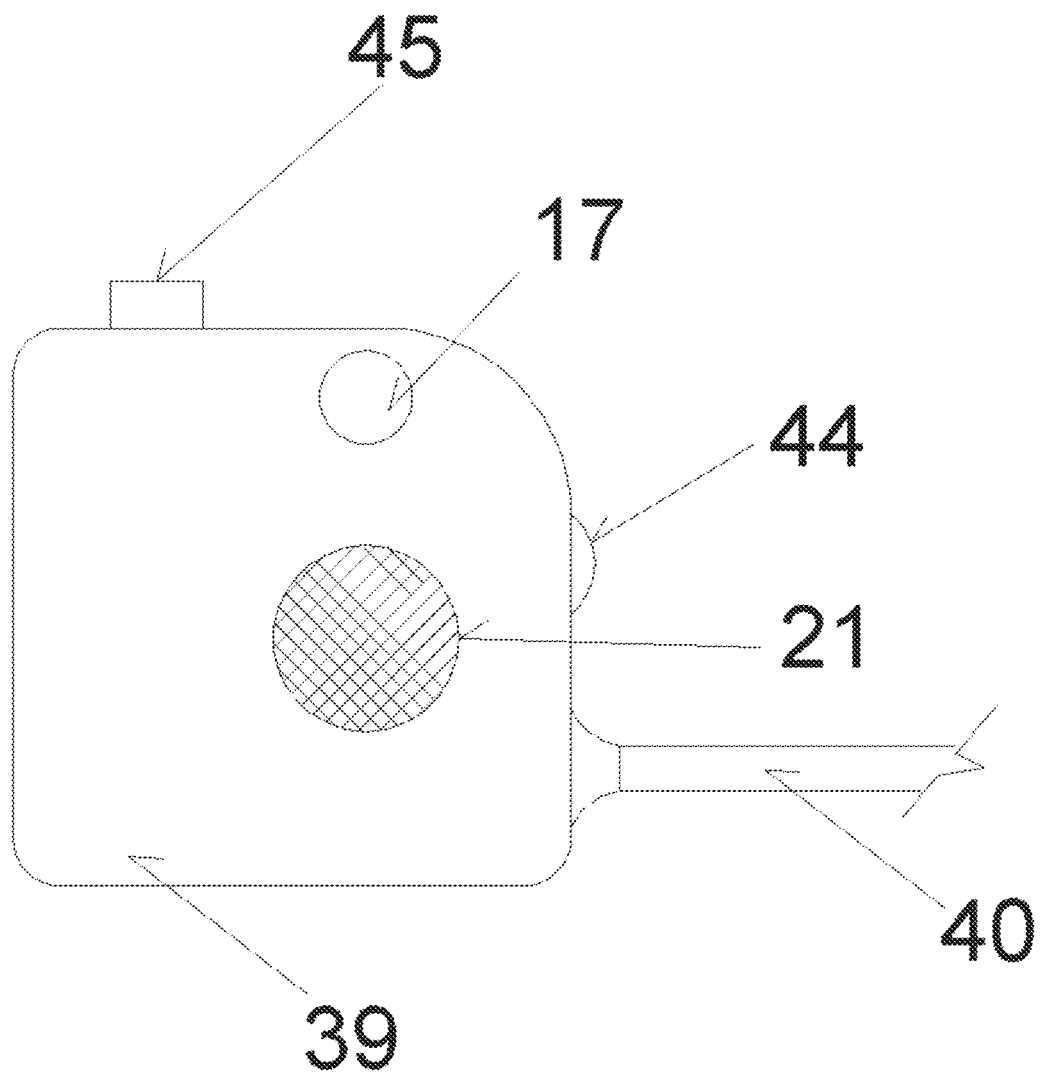
FIG. 10 shows a side view of the front panel (39): where you can see some of the installed components such as the shock sensor (45), the obstacle sensor (17), you can also see the warning horn (21), the peripheral view front camera (44), and the multifiber connection (40).

As seen in FIGS. 1-10, the present invention is a hydraulic safety motorcycle system that is connected to the hydraulic brake system of a motorcycle, the hydraulic motorcycle system comprises a main module (48) that comprises of a master cylinder (14), a spring (32), a first pressure sensor (E7), a pair of inlet ports (A30) and (B31), a conduit system (16), a bolt (49), a release valve (A36), a check valve (2), a pressure control (1), a pressurized internal tank (27), a liquid pump (9), a motor (22), relief hole (33), a relief valve (3), a discharge valve (B41), a pair of liquid outlet ports (A34), a main module electronic card (24), a multifiber connection line (40), the main module connects (48) to a front hydraulic brake of the motorcycle and to the rear hydraulic brake of the motorcycle. An external tank (28) connects to the main module (48), the external tank 28 stores a hydraulic fluid, the external tank (28) connects to the main module (48) via the conduit system 16. And, a front panel (39) that is connected to the main module (48) via the multifiber connection (40), the front panel (39) comprises a light sensor (11), an obstacle sensor (17), an incline sensor (26), a proximity sensor (38), a shock sensor (45), a motion sensor (6), a 911 button (20), a microphone (29), a visual signal light (23) an alert horn (21), a touch screen (47), a facial recognition camera (4), a fingerprint sensor (5), a front panel electronic card (46) that has a transceiver (12) and a global position device (10), a battery (25), a battery charger (13), an accelerometer (18), and an integrated antenna (37).

In an embodiment of the present invention, the hydraulic safety motorcycle system alerts a motorcycle of obstacles that my cause accidents.

In another embodiment of the present invention, the hydraulic safety motorcycle system activates the brake system of the motorcycle to control the descending speed of the motorcycle when descending a terrain.

In a yet another embodiment of the present invention, the hydraulic safety motorcycle system locks the brakes of the motorcycle when an unauthorized user tries to steal the motorcycle.

In yet still another embodiment of the present invention, the hydraulic safety motorcycle system alerts a third party of any emergency or unauthorized use of the motorcycle via the transceiver of the front panel electronic card.

In yet still a further embodiment of the present invention, the hydraulic safety motorcycle system alerts a motorcycle driver of any brake failure that may be due to a leak in the hydraulic system.

In a further embodiment of the present invention, the hydraulic safety motorcycle system alerts a motorcycle rider to look forward when a specific period of time has lapsed.

In still a further embodiment of the present invention, the hydraulic safety motorcycle system can be controlled by an owner of the motorcycle remotely via the transceiver that connects to the front panel electronic card.

What is claimed is:

1. A hydraulic safety motorcycle system that is connected to the hydraulic brake system of a motorcycle, the hydraulic motorcycle system comprises:
   a main module that comprises of a master cylinder, a spring, a first pressure sensor, a pair of inlet ports, a conduit system, a bolt, a valve, a check valve, a pressure control, a pressurized internal tank, a liquid pump, a motor, a relief hole, a relief valve, a discharge valve, a pair of liquid outlet ports, a main module electronic card, a multifiber connection line, the main module connects to a front hydraulic brake of the motorcycle and to a rear hydraulic brake of the motorcycle;
   an external tank connects to the main module, the external tank stores a hydraulic fluid, the external tank connects to the main module via the conduit system; and
   a front panel that is connected to the main module via the multifiber connection, the front panel comprises a light sensor, an obstacle sensor, an incline sensor, a proximity sensor, a shock sensor, a motion sensor, a 911 button, a microphone, a visual signal light an alert horn, a touch screen, a facial recognition camera, fingerprint sensor, a front panel electronic card that has a transceiver and a global position device, a battery, a battery charger, an accelerometer, and an integrated antenna.

2. The hydraulic safety motorcycle system that is connected to the hydraulic brake system of the motorcycle of claim 1, wherein the hydraulic safety motorcycle system alerts a motorcycle of obstacles that may cause accidents.

3. The hydraulic safety motorcycle system that is connected to the hydraulic brake system of the motorcycle of claim 1, wherein the hydraulic safety motorcycle system activates the brake system of the motorcycle to control a descending speed of the motorcycle when descending a terrain.

4. The hydraulic safety motorcycle system that is connected to the hydraulic brake system of the motorcycle of claim 1, wherein the hydraulic safety motorcycle system locks the brakes of the motorcycle when an unauthorized user tries to steal the motorcycle.

5. The hydraulic safety motorcycle system that is connected to the hydraulic brake system of the motorcycle of claim 1, wherein the hydraulic safety motorcycle system alerts a third party of any emergency or unauthorized use of the motorcycle via the transceiver of the front panel electronic card.

6. The hydraulic safety motorcycle system that is connected to the hydraulic brake system of the motorcycle of claim 1, wherein the hydraulic safety motorcycle system alerts a motorcycle driver of any brake failure that may be due to a leak in the hydraulic system.

7. The hydraulic safety motorcycle system that is connected to the hydraulic brake system of the motorcycle of claim 1, wherein the hydraulic safety motorcycle system alerts a motorcycle rider to look forward when a specific period of time has lapsed.

8. The hydraulic safety motorcycle system that is connected to the hydraulic brake system of the motorcycle of claim 1, wherein the hydraulic safety motorcycle system is controlled by an owner of the motorcycle remotely via the transceiver that connects to the front panel electronic card.

* * * * *